United States Patent
Todaka (10) Patent No.: US 11,461,059 B2
(45) Date of Patent: Oct. 4, 2022

(54) UPDATE SYSTEM FOR UPDATING FIRMWARE FOR WIRELESS COMMUNICATION DEVICE COUPLED TO PRINTING DEVICE

(71) Applicant: SEIKO EPSON CORPORATION, Tokyo (JP)

(72) Inventor: Shingo Todaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/215,143

(22) Filed: Mar. 29, 2021

(65) Prior Publication Data

US 2021/0303237 A1   Sep. 30, 2021

(30) Foreign Application Priority Data

Mar. 31, 2020 (JP) .............................. JP2020-064738

(51) Int. Cl.
    *G06F 3/12* (2006.01)
    *H04L 67/00* (2022.01)
    *G06F 8/65* (2018.01)
    *H04W 88/02* (2009.01)

(52) U.S. Cl.
    CPC .......... *G06F 3/1225* (2013.01); *G06F 3/1203* (2013.01); *G06F 3/1236* (2013.01); *G06F 3/1292* (2013.01); *G06F 8/65* (2013.01); *H04L 67/34* (2013.01); *H04W 88/02* (2013.01)

(58) Field of Classification Search
    CPC .............................. G06F 3/1225; G06F 3/123
    See application file for complete search history.

(56) References Cited

U.S. PATENT DOCUMENTS

| | | | |
|---|---|---|---|
| 2005/0037709 A1* | 2/2005 | Hwang | H04N 1/00127 455/66.1 |
| 2006/0116166 A1* | 6/2006 | Hibino | H04W 28/18 455/557 |
| 2010/0175074 A1 | 7/2010 | Kanada | |
| 2017/0003916 A1* | 1/2017 | Noguchi | G06K 15/1817 |

FOREIGN PATENT DOCUMENTS

JP      2010-160616 A      7/2010

* cited by examiner

*Primary Examiner* — Benjamin O Dulaney
(74) *Attorney, Agent, or Firm* — Global IP Counselors, LLP (57) ABSTRACT

An update system includes a printing device configured to be coupled to a wireless communication device performing first communication, and a processing device configured to be connected to the printing device via second communication. The processing device transmits a transmission request for identification information identifying the wireless communication device, to the printing device. The printing device, when receiving the transmission request for the identification information from the processing device, transmits the identification information to the processing device. The processing device, when receiving the identification information from the printing device, transmits firmware corresponding to the received identification information as firmware for update to the printing device. The printing device, when receiving the firmware for update from the processing device, updates firmware stored in a storage unit to the firmware for update.

5 Claims, 8 Drawing Sheets

UPDATE SYSTEM FOR UPDATING FIRMWARE FOR WIRELESS COMMUNICATION DEVICE COUPLED TO PRINTING DEVICE

The present application is based on, and claims priority from JP Application Serial Number 2020-064738, filed Mar. 31, 2020, the disclosure of which is hereby incorporated by reference herein in its entirety.

BACKGROUND

1. Technical Field

The present disclosure relates to an update system, a printing device, and a program.

2. Related Art

Research and development on a printing device communicating via a wireless communication device coupled thereto have been underway.

In connection with this, a printing device in which firmware controlling a wireless communication device coupled thereto is installed and in which the installed firmware can be updated to new firmware via an information processing device is known. JP-A-2010-160616 is an example of such a printing device.

In the printing device as disclosed in JP-A-2010-160616, the firmware already installed in the printing device is updated to firmware selected by a user, via the information processing device. Therefore, in the printing device, the firmware already installed in the printing device may be wrongly updated to firmware that is different from firmware corresponding to the wireless communication device coupled thereto. That is, in the printing device, the firmware already installed in the printing device may be updated to firmware that is different from desired firmware.

SUMMARY

An aspect of the present disclosure is directed to an update system including a printing device configured to be coupled to a wireless communication device performing first communication, and a processing device configured to be connected to the printing device via second communication that is different from the first communication by the wireless communication device. The processing device transmits a transmission request for identification information identifying the wireless communication device, to the printing device. The printing device, when receiving the transmission request from the processing device, transmits the identification information to the processing device. The processing device, when receiving the identification information from the printing device, transmits firmware corresponding to the received identification information as firmware for update to the printing device. The printing device, when receiving the firmware for update from the processing device, updates firmware stored in a storage unit to the received firmware for update.

Another aspect of the present disclosure is directed to a printing device including: a coupling unit configured to be coupled to a wireless communication device performing first communication; a communication unit performing second communication that is different from the first communication, with a processing device; a storage unit storing firmware; and a control unit. The control unit, when receiving a transmission request for identification information identifying the wireless communication device, transmits the identification information to the processing device. The control unit, when receiving firmware corresponding to the identification information as firmware for update from the processing device, updates firmware stored in the storage unit to the firmware for update.

Still another aspect of the present disclosure is directed to a non-transitory computer-readable storage medium storing a program that causes a processing device to update firmware in a printing device configured to be coupled to a wireless communication device performing first communication. The program causes the processing device to execute: transmitting an acquisition request for identification information identifying the wireless communication device, to the printing device; and when receiving the identification information as a response to the request from the printing device, transmitting firmware corresponding to the received identification information as firmware for update to the printing device.

DESCRIPTION OF EXEMPLARY EMBODIMENTS

Embodiment

An embodiment of the present disclosure will now be described with reference to the drawings.

Outline of Update System

First, an outline of an update system according to the embodiment is described.

The update system has a printing device configured to be coupled to a wireless communication device performing first communication, and a processing device configured to be coupled to the printing device via second communication. The second communication is different from the first communication by the wireless communication device. First wireless communication, second wireless communication, and third wireless communication performed between the printing device and an external device via the wireless communication device as described later are an example of the first communication.

The processing device transmits a transmission request for identification information identifying the wireless communication device, to the printing device.

The printing device, when receiving the transmission request for the identification information from the processing device, transmits the identification information to the processing device.

The processing device, when receiving the identification information from the printing device, transmits firmware corresponding to the received identification information as firmware for update to the printing device.

The printing device, when receiving the firmware for update from the processing device, updates already installed firmware that is executable when receiving the firmware for update, to the received firmware for update.

Thus, the update system can restrain the firmware already installed in the printing device from being updated to firmware that is different from desired firmware. Hereinafter, the configuration of the update system and processing performed by the printing device and the processing device in connection with the update of the firmware in the printing device are described in detail.

The processing device may be any device that can update the firmware in the printing device. Thus, in the description below, an example where the processing device is an information processing device such as a PC (personal computer) is described.

Configuration of Update System

The configuration of the update system according to the embodiment will now be described, using an update system 1 as an example of the update system according to the embodiment.

Figure 1:
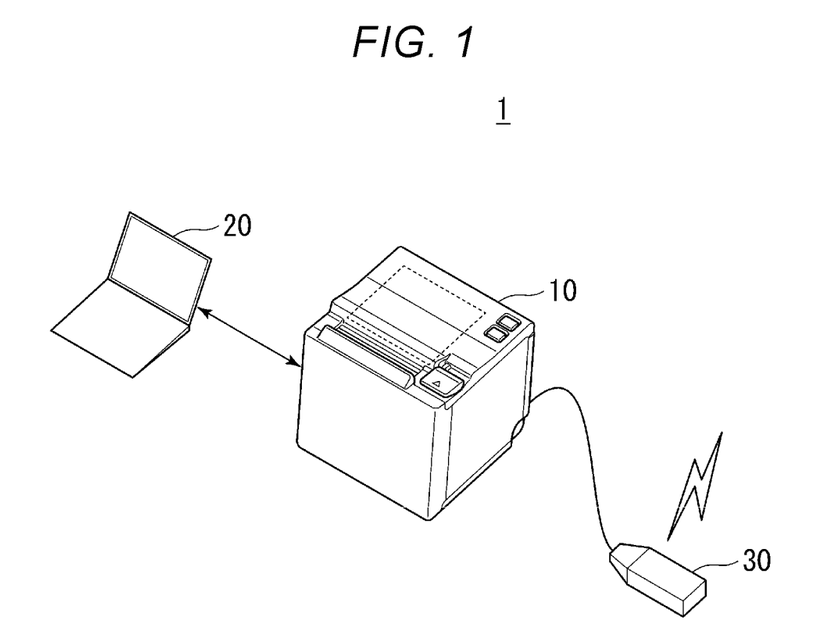
FIG. 1 shows an example of the configuration of an update system.

FIG. 1 shows an example of the configuration of the update system 1.

The update system 1 has a printing device 10 and an information processing device 20.

The printing device 10 is an example of the foregoing printing device. The printing device 10 is, for example, a paper roll printer that prints on a recording paper drawn out of a paper roll of long recording paper. In FIG. 1, the recording paper and the paper roll are omitted in order not to make the illustration complicated. The printing device 10 may be another type of printer instead of the paper roll printer.

The printing device 10 can be coupled to a plurality of types of wireless communication devices operating as models compatible with the printing device 10, of various wireless communication devices performing wireless communication, as a wireless communication device 30 shown in FIG. 1. For example, when a first wireless communication device performing wireless communication based on a predetermined first type of communication standard as first wireless communication is coupled to the printing device 10 as the wireless communication device 30, the printing device 10 performs the first wireless communication with an external device, not illustrated, via the wireless communication device 30. Also, for example, when a second wireless communication device performing wireless communication based on a second type of communication standard that is different from the first type as second wireless communication is coupled to the printing device 10 as the wireless communication device 30, the printing device 10 performs the second wireless communication with an external device, not illustrated, via the wireless communication device 30.

The first type of communication standard is a communication standard corresponding to the wireless communication device 30, for example, Wi-Fi (trademark registered) or the like. The second type of communication standard is, for example, Bluetooth (trademark registered) or the like. Therefore, the printing device 10 can perform wireless communication based on various types of communication standards according to the type of the wireless communication device 30 coupled thereto. The second type of communication standard may be Wi-Fi (trademark registered) using a different frequency band from the frequency band used in Wi-Fi (trademark registered) that is the first type of communication standard. The wireless communication device 30 may be configured to be provided in the update system 1.

In the printing device 10, firmware corresponding to the wireless communication device coupled thereto as the wireless communication device 30 is installed. Here, firmware corresponding to a wireless communication device is firmware corresponding to the type of this wireless communication device. The firmware corresponding to the wireless communication device is firmware including software controlling the wireless communication device, that is, a driver controlling the wireless communication device. Therefore, when a new type of wireless communication device is coupled to the printing device 10 as the wireless communication device 30 and the firmware already installed in the printing device 10 does not include a driver controlling this new type of wireless communication device, the firmware is updated to firmware including the driver. In the printing device 10, such update of firmware is performed via the information processing device 20, described later.

However, when the firmware already installed in the printing device 10 is to be updated to firmware selected by a user via the information processing device 20, the user may wrongly select firmware that does not correspond to the wireless communication device coupled to the printing device 10 as the wireless communication device 30. In this case, the firmware that does not correspond to the wireless communication device is installed into the printing device 10 unless the user notices the wrong selection. The firmware that does not correspond to the wireless communication device is firmware that does not include a driver controlling the wireless communication device.

Thus, when the firmware already installed in the printing device 10 is to be updated via the information processing device 20, the printing device 10 receives a transmission request for identification information identifying the wireless communication device 30, from the information processing device 20. The identification information is, for example, information representing the type of the wireless communication device currently coupled to the printing device 10 as the wireless communication device 30. The identification information may be other information that can identify the wireless communication device currently coupled to the printing device 10 as the wireless communication device 30. When receiving the transmission request from the information processing device 20, for example, the printing device 10 acquires the identification information from the wireless communication device 30. The printing device 10 then transmits the acquired identification information to the information processing device 20. Thus, the printing device 10 can receive firmware corresponding to the identification information as firmware for update, as a response to the identification information transmitted to the information processing device 20. The firmware corresponding to the identification information is firmware corresponding to the wireless communication device identified by the identification information. When receiving the firmware for update from the information processing device 20, the printing device 10 updates the already installed firmware that is executable when receiving the firmware for update, to the received firmware for update. Thus, the printing device 10 can restrain the firmware already installed in the printing device 10 from being updated to firmware that does not correspond to the wireless communication device currently coupled to the printing device 10 as the wireless communication device 30. That is, the printing device 10 can restrain the firmware already installed in the printing device 10 from being updated to firmware that is different from desired firmware.

The information processing device 20 is an example of the foregoing processing device. The information processing device 20 is, for example, a notebook PC, tablet PC, multifunction mobile phone (smartphone), PDA (personal digital assistant) or the like. The information processing device 20 may be another type of information processing device such as a desktop PC, workstation or the like.

The information processing device 20 is coupled in such a way as to be able to communicate with the printing device 10 wirelessly or via a wire. In the example shown in FIG. 1, the information processing device 20 is coupled in such a way as to be able to communicate with the printing device 10 via a wire. The wireless or wired communication between the information processing device 20 and the printing device 10 is an example of the second communication.

When the firmware already installed in the printing device 10 is to be updated, the information processing device 20 transmits the foregoing transmission request for identification information to the printing device 10 in response to an accepted operation. The information processing device 20 receives the identification information from the printing device 10 as a response to the transmission request transmitted to the printing device 10. The information processing device 20 specifies firmware corresponding to the received identification information as firmware for update. The information processing device 20 may be configured to store, in advance, the firmware corresponding to the received identification information. Alternatively, the information processing device 20 may be configured not to store the firmware in advance. When configured to store the firmware in advance, the information processing device 20 specifies the firmware corresponding to the received identification information as firmware for update, from among one or more pieces of firmware stored in advance in a storage area in the information processing device 20. The information processing device 20 then reads out the specified firmware for update from the storage area. When configured not to store the firmware in advance, the information processing device 20 searches the Internet or the like for the firmware. The information processing device 20 specifies the firmware found as a result of the search, as firmware for update. The information processing device 20 then downloads the specified firmware for update. After acquiring the firmware for update by such reading or downloading, the information processing device 20 transmits the acquired firmware for update to the printing device 10. Thus, the information processing device 20 can cause the printing device 10 to update the firmware installed therein to the firmware for update. Here, the information processing device 20 may be configured to transmit, to the printing device 10, a command for the printing device 10 to start updating the firmware along with the firmware for update. In the description below, an example where the firmware for update also functions as this command is described.

Figure 2:
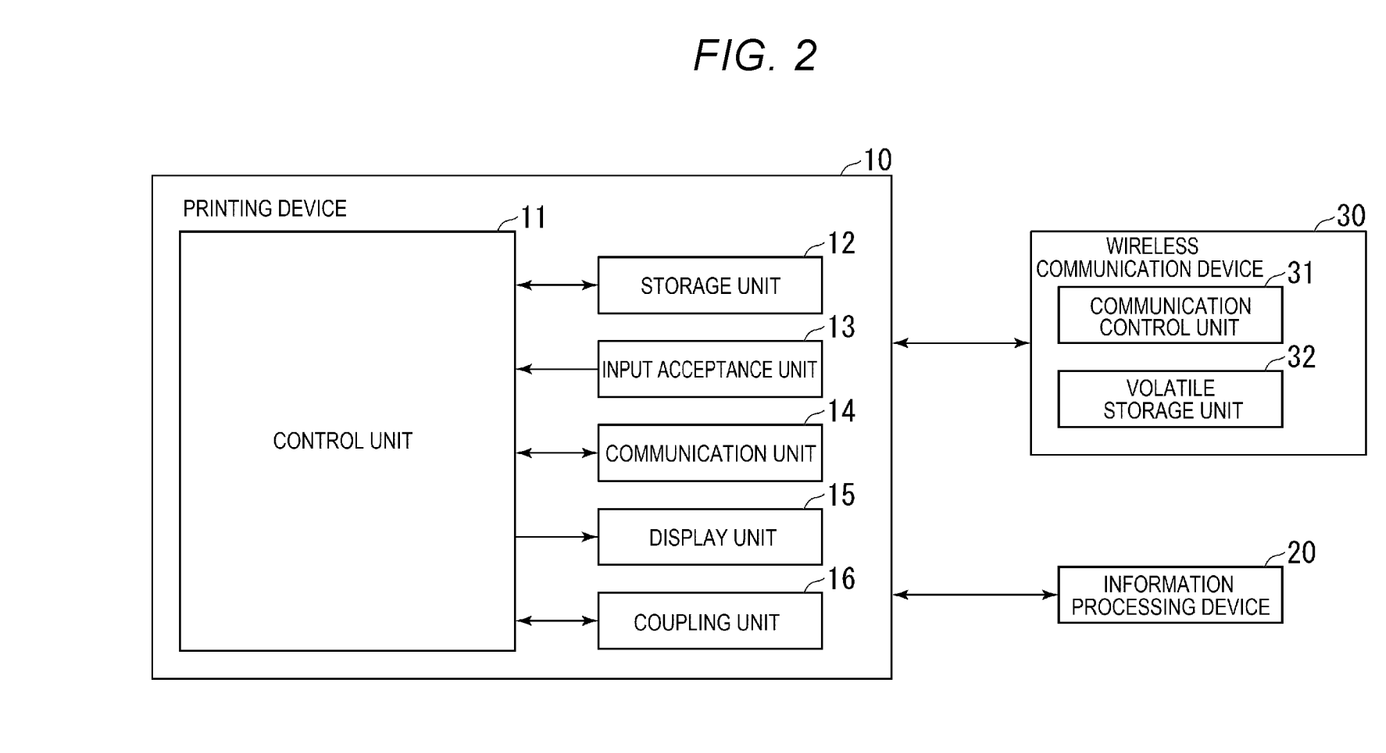
FIG. 2 shows an example of the configuration of a printing device and an example of the configuration of a wireless communication device.

Configuration of Printing Device and Configuration of Wireless Communication Device The configuration of the printing device 10 and the configuration of the wireless communication device 30 will now be described with reference to FIG. 2. FIG. 2 shows an example of the configuration of the printing device 10 and an example of the configuration of the wireless communication device 30.

The printing device 10 has, for example, a control unit 11, a storage unit 12, an input acceptance unit 13, a communication unit 14, a display unit 15, and a coupling unit 16. These components are coupled in such a way as to be able to communicate with each other via a bus. The printing device 10 communicates with the information processing device 20 via the communication unit 14. The printing device 10 is coupled in such a way as to be able to communicate with the wireless communication device 30 via the coupling unit 16.

The control unit 11 controls the entirety of the printing device 10. The control unit 11 is, for example, a CPU (central processing unit). The control unit 11 may be another type of processor such as an FPGA (field-programmable gate array) instead of the CPU. The control unit 11 executes various programs stored in the storage unit 12. The various programs include firmware already installed in the printing device 10, and the like. The control unit 11 may also be referred to as a processor.

The storage unit 12 includes, for example, an HDD (hard disk drive), SSD (solid-state drive), EEPROM (electrically erasable programmable read-only memory), ROM (read-only memory), RAM (random-access memory) or the like. The storage unit 12 may be an external storage device coupled to the printing device 10 via a digital input/output port or the like, such as a USB port, instead of the storage unit built in the printing device 10. The storage unit 12 stores various kinds of information processed by the printing device 10 and various programs such as firmware already installed in the printing device 10, or the like. The storage unit 12 may also be referred to as a memory.

The input acceptance unit 13 is, for example, a touch panel integrated with the display unit 15. The input acceptance unit 13 may be another type of input device formed separately from the display unit 15, such as a keyboard, mouse, or touch pad. The input acceptance unit 13 may include a power switch, operation switch, or the like.

The communication unit 14 is formed of communication hardware conforming to a predetermined communication standard. An example of the communication hardware is hardware such as a communication circuit, communication port, communication board, or communication connector. The communication port includes, for example, a digital input/output port such as a USB port, Ethernet (trademark registered) port, or the like.

The display unit 15 is, for example, a liquid crystal display panel, organic EL (electroluminescence) display panel, or the like. The printing device 10 may not have the display unit 15.

The coupling unit 16 is a connector coupled to the wireless communication device 30, for example, a digital input/output port such as a USB port. The coupling unit 16 may be integrated with the communication unit 14. The coupling unit 16 can be physically coupled to the wireless communication device 30. The coupling unit 16 may also be referred to as a coupling connector.

The wireless communication device 30 has a communication control unit 31 and the volatile storage unit 32. The wireless communication device 30 may also be referred to as a wireless LAN unit.

The communication control unit 31, when receiving a driver from the printing device 10, causes the volatile storage unit 32 to store the received driver. The communication control unit 31 then reads out the driver stored in the volatile storage unit 32 and controls the wireless communication by the printing device 10 via the wireless communication device 30, based on the read-out driver. The communication control unit 31 may also be referred to as a communication processor.

The volatile storage unit 32 is a volatile storage unit, for example, a RAM. The volatile storage unit 32 may also be referred to as a volatile memory. The wireless communication device 30 may be configured to be inserted in the coupling unit 16 of the printing device 10 or may be configured to be coupled to the coupling unit 16 of the printing device 10 via a wired communication cable such as a USB cable.

Configuration of Firmware Installed in Printing Device

The configuration of firmware installed into the printing device 10 will now be described.

Figure 3:
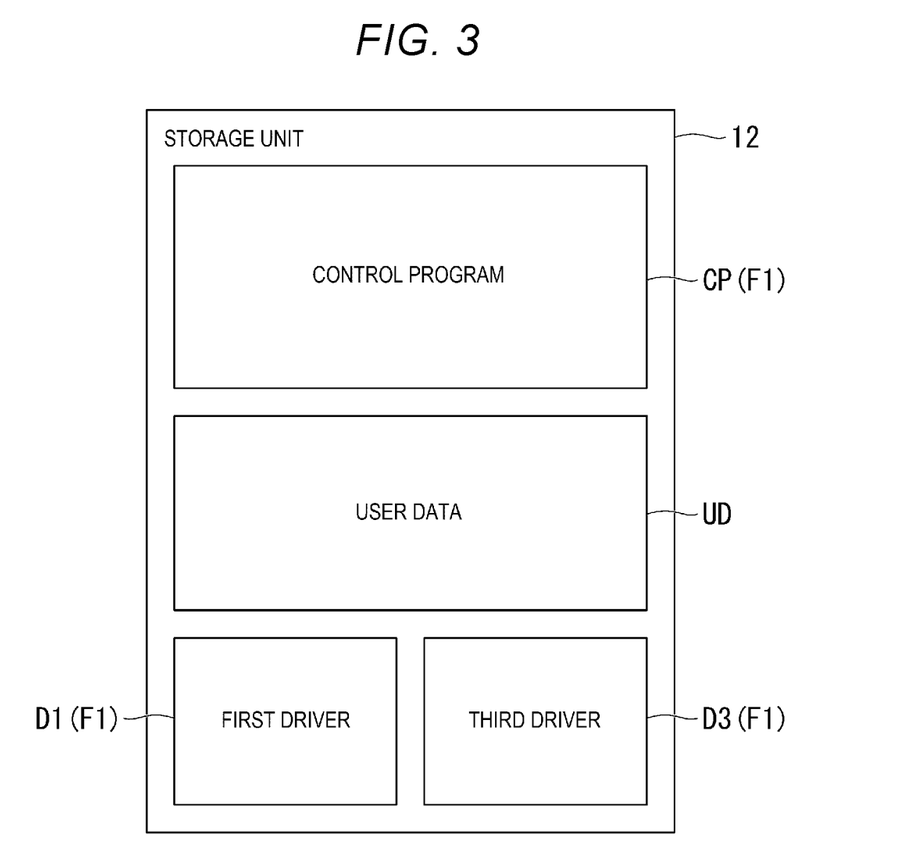
FIG. 3 shows an example of the inside of a storage area of a storage unit when predetermined first firmware is already installed in the printing device.

FIG. 3 shows an example of the inside of the storage area of the storage unit 12 when predetermined first firmware is already installed in the printing device 10.

As shown in FIG. 3, when the predetermined first firmware is already installed in the printing device 10, the storage area of the storage unit 12 is divided into at least four areas, that is, an area where a control program CP is stored, an area where user data UD is stored, an area where a first driver D1 is stored, and an area where a third driver D3 is stored. However, in this case, the storage area of the storage unit 12 may be divided into five or more areas including these four areas. The first firmware includes three programs, that is, the control program CP, the first driver D1, and the third driver D3 stored in the storage area of the storage unit 12. Thus, in FIG. 3, the first firmware is referred to as firmware F1.

The control program CP is a program controlling the printing device 10 and is executed by the control unit 11. That is, the control program CP is a program forming the main body of the first firmware. By executing the control program CP, for example, when receiving a transmission request for identification information of the wireless communication device coupled to the printing device 10 as the wireless communication device 30 from the information processing device 20, the control unit 11 of the printing device 10 acquires the identification information of the wireless communication device and transmits the identification information to the information processing device 20. Also, by executing the control program CP, for example, when receiving firmware for update from the information processing device 20, the control unit 11 of the printing device 10 updates already installed firmware that is executable when receiving the firmware for update, to the received firmware for update.

The first driver D1 is an example of the foregoing first driver. That is, the first driver D1 is an example of the driver controlling the first wireless communication device coupled to the printing device 10 as the wireless communication device 30. When starting up the printing device 10 after the first wireless communication device is coupled to the printing device 10 as the wireless communication device 30, the control unit 11 causes the volatile storage unit 32 of the wireless communication device 30 to store the first driver after the wireless communication device 30 is started up. Thus, the printing device 10 can perform the first wireless communication via the wireless communication device 30.

The third driver D3 is an example of a driver controlling a third wireless communication device coupled to the printing device 10 as the wireless communication device 30. The third wireless communication device is a wireless communication device performing wireless communication based on a third type of communication standard as third wireless communication. The third type of communication standard is, for example, Wi-Fi (trademark registered) using a different frequency band from the frequency band used in Wi-Fi (trademark registered) that is the first type of communication standard, or the like. When starting up the printing device 10 after the third wireless communication device is coupled to the printing device 10 as the wireless communication device 30, the control unit 11 causes the volatile storage unit 32 of the wireless communication device 30 to store the third driver after the wireless communication device 30 is started up. Thus, the printing device 10 can perform the third wireless communication via the wireless communication device 30.

The firmware F1, which is an example of the first firmware, does not include all of the first driver D1, a second driver D2, and the third driver D3, due to the limitation of the capacity of the storage unit 12 or the like. That is, the firmware F1 includes the first driver D1 and the third driver D3 but does not include the second driver D2. Therefore, when the firmware F1 is installed in the printing device 10, the printing device 10 cannot perform the second wireless communication via the second wireless communication device even when the second wireless communication device is coupled thereto. Thus, when the second wireless communication device is coupled to the printing device 10 as the wireless communication device 30 in this case, the firmware in the printing device 10 is updated.

The user data UD may be any data that the user of the printing device 10 can store in the printing device 10. The content of the user data UD is not changed by the update of the firmware. Therefore, in this embodiment, the description of the user data UD is omitted.

Figure 4:
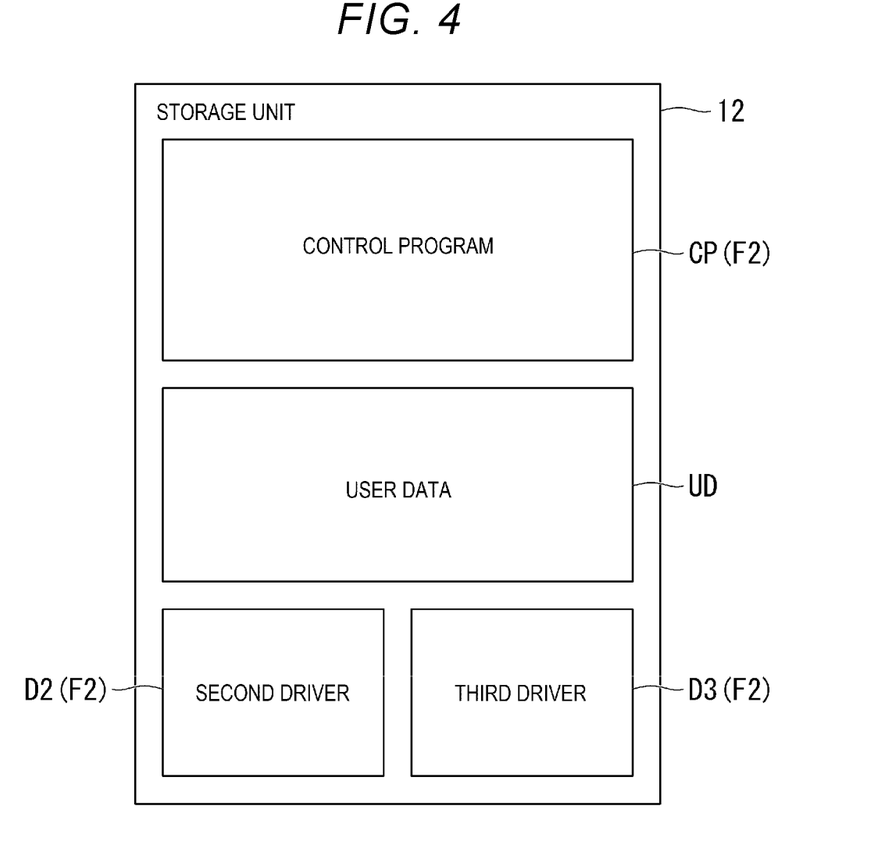
FIG. 4 shows an example of the inside of the storage area of the storage unit when predetermined second firmware is already installed in the printing device.

Meanwhile, FIG. 4 shows an example of the inside of the storage area of the storage unit 12 when predetermined second firmware is already installed in the printing device 10.

As shown in FIG. 4, when the predetermined second firmware is already installed in the printing device 10, the storage area of the storage unit 12 is divided into at least four areas, that is, an area where a control program CP is stored, an area where user data UD is stored, an area where a second driver D2 is stored, and an area where a third driver D3 is stored. However, in this case, the storage area of the storage unit 12 may be divided into five or more areas including these four areas. The second firmware includes three programs, that is, the control program CP, the second driver D2, and the third driver D3 stored in the storage area of the storage unit 12. Thus, in FIG. 4, the second firmware is referred to as firmware F2.

The second driver D2 is an example of the foregoing second driver. That is, the second driver D2 is an example of the driver controlling the second wireless communication device coupled to the printing device 10 as the wireless communication device 30. When starting up the printing device 10 after the second wireless communication device is coupled to the printing device 10 as the wireless communication device 30, the control unit 11 causes the volatile storage unit 32 of the wireless communication device 30 to store the second driver after the wireless communication device 30 is started up. Thus, the printing device 10 can perform the second wireless communication via the wireless communication device 30.

In this way, the firmware F2, which is an example of the second firmware, includes the second driver D2 and the third driver D3 but does not include the first driver D1. Therefore, when the firmware F2 is installed in the printing device 10, the printing device 10 cannot perform the first wireless communication via the first wireless communication device even when the first wireless communication device is coupled thereto. Thus, when the first wireless communication device is coupled to the printing device 10 as the wireless communication device 30 in this case, the firmware in the printing device 10 is updated.

In this way, the printing device 10 updates the firmware according to the type of the wireless communication device coupled to the printing device 10 as the wireless communication device 30. In the description below, processing in which the printing device 10 updates the firmware and processing in which the information processing device 20 causes the printing device 10 to update the firmware are described.

As shown in FIGS. 3 and 4, any firmware that can be installed in the printing device 10 includes the control program CP.

Processing in which Printing Device Updates Firmware

Figure 5:
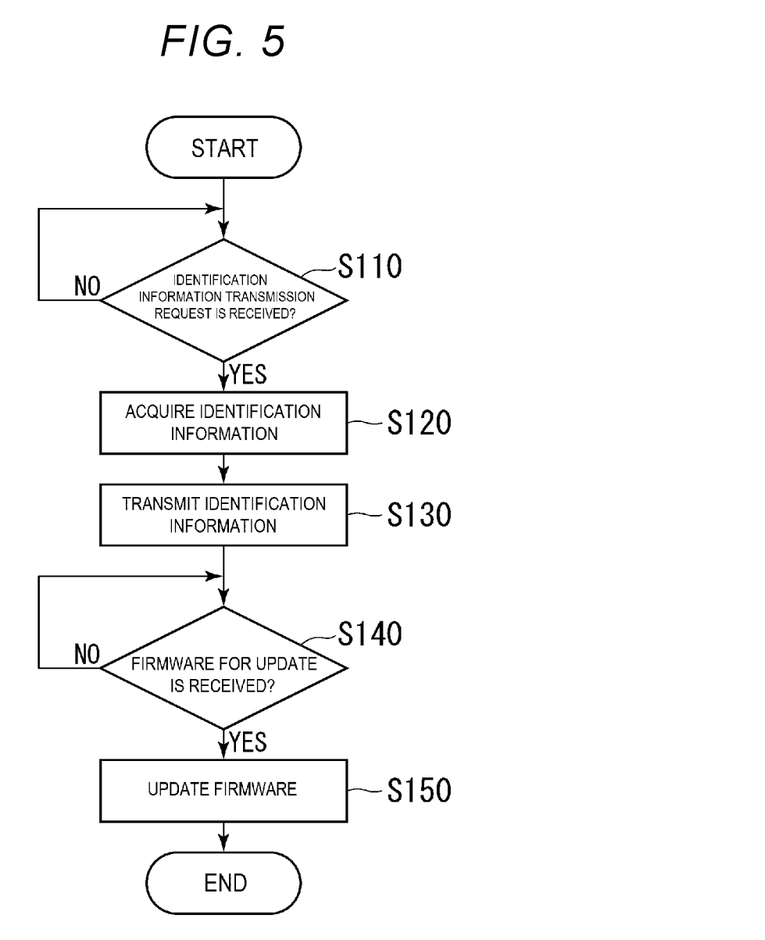
FIG. 5 shows an example of a flow of processing in which the printing device updates the firmware.

The processing in which the printing device 10 updates the firmware will now be described with reference to FIG. 5. FIG. 5 shows an example of the flow of the processing in which the printing device 10 updates the firmware. In the description below, an example where the first firmware is already installed in the printing device 10 is described. Also, in the description below, an example where the information processing device 20 is coupled to the printing device 10 at a timing before the processing in step S110 shown in FIG. 5 is performed is described. Also, in the description below, an example where the second wireless communication device is coupled to the printing device 10 as the wireless communication device 30 at this timing is described.

The control unit 11 waits until receiving a transmission request for identification information identifying the wireless communication device 30 from the information processing device 20 (step S110).

When it is determined that a transmission request for identification information identifying the wireless communication device 30 is received from the information processing device 20 (YES in step S110), the control unit 11 acquires the identification information from the wireless communication device 30 (step S120). To acquire the identification information from the wireless communication device 30, a known method or a method to be developed from now on may be employed.

Next, the control unit 11 transmits the identification information acquired in step S120 to the information processing device 20 (step S130).

Next, the control unit 11 waits until receiving firmware for update corresponding to the identification information from the information processing device 20 as a response to the identification information transmitted to the information processing device 20 in step S130 (step S140).

When it is determined that firmware for update corresponding to the identification information is received from the information processing device 20 as a response to the identification information transmitted to the information processing device 20 in step S130 (YES in step S140), the control unit 11 updates the already installed firmware that is executable when receiving the firmware for update, that is, the first firmware, to the received firmware for update (step S150). As described above, the second wireless communication device is coupled in advance to the printing device 10 as the wireless communication device 30. Therefore, the identification information transmitted by the control unit 11 to the information processing device 20 in step S130 is identification information identifying the second wireless communication device. In this case, the firmware for update received by the control unit 11 from the information processing device 20 in step S140 is the second firmware. Therefore, in step S150, the control unit 11 updates the firmware already installed in the printing device 10, which is the first firmware, to the second firmware. For the printing device 10 to update the firmware in step S150, a known method or a method to be developed from now on may be employed. After the processing in step S150, the control unit 11 ends the processing in the flowchart shown in FIG. 5.

In this way, when receiving a transmission request for identification information from the information processing device 20, the printing device 10 transmits the identification information to the information processing device 20. When receiving firmware for update from the information processing device 20, the printing device 10 updates the already installed firmware that is executable when receiving the firmware for update, to the received firmware for update. Thus, the printing device 10 can restrain the firmware already installed in the printing device 10 from being updated to firmware that does not correspond to the wireless communication device currently coupled to the printing device 10 as the wireless communication device 30. That is, the printing device 10 can restrain the firmware already installed in the printing device 10 from being updated to firmware that is different from desired firmware.

Figure 6:
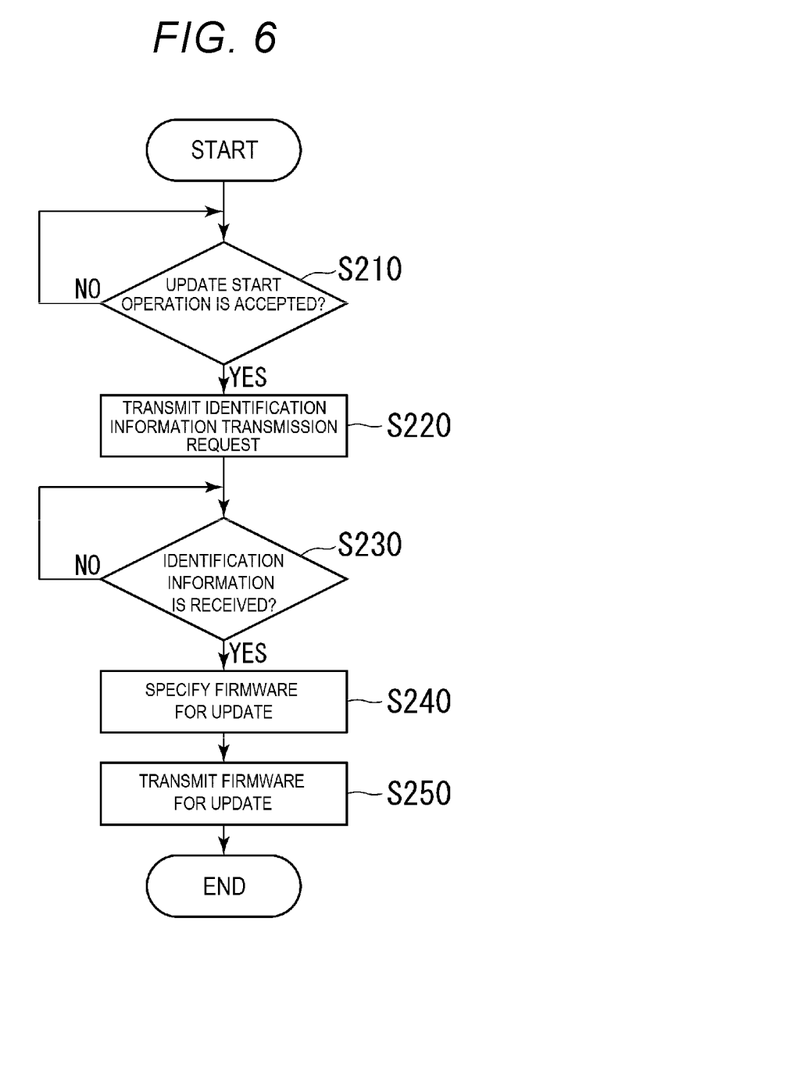
FIG. 6 shows an example of a flow of processing in which an information processing device causes the printing device to update the firmware.

Processing in which Information Processing Device Causes Printing Device to Update Firmware The processing in which the information processing device 20 causes the printing device 10 to update the firmware will now be described with reference to FIG. 6. FIG. 6 shows an example of the flow of the processing in which the information processing device 20 causes the printing device 10 to update the firmware. In the description below, an example where the first firmware is already installed in the printing device 10 is described. Also, in the description below, an example where the information processing device 20 is coupled to the printing device 10 at a timing before the processing in step S210 shown in FIG. 6 is performed is described. Also, in the description below, an example where the second wireless communication device is coupled to the printing device 10 as the wireless communication device 30 at this timing is described.

The information processing device 20 waits until accepting a predetermined update start operation (step S210). The predetermined update start operation may be any operation that triggers the information processing device 20 to start the processing of updating the firmware already installed in the printing device 10.

When it is determined that the predetermined update start operation is accepted (YES in step S210), the information processing device 20 transmits a transmission request for identification information identifying the wireless communication device coupled to the printing device 10 as the wireless communication device 30, to the printing device 10 (step S220).

Next, the information processing device 20 waits until receiving the identification information from the printing device 10 as a response to the transmission request for the identification information transmitted to the printing device 10 in step S220 (step S230).

When it is determined that the identification information is received from the printing device 10 as a response to the transmission request for the identification information transmitted to the printing device 10 in step S220 (YES in step S230), the information processing device 20 acquires firmware corresponding to the received identification information as firmware for update (step S240). For the information processing device 20 to acquire the firmware corresponding to the identification information as firmware for update, either one of the foregoing two methods may be employed. Also, another known method or a method to be developed from now on may be employed.

Next, the information processing device 20 transmits the firmware for update acquired in step S240 to the printing device 10 (step S250) and ends the processing in the flowchart shown in FIG. 6.

In this way, when transmitting an acquisition request for identification information identifying the wireless communication device coupled to the printing device 10 as the wireless communication device 30, and receiving the identification information identifying the wireless communication device from the printing device 10, the information processing device 20 transmits firmware corresponding to the received identification information to the printing device 10 as firmware for update. Thus, the information processing device 20 can restrain the firmware already installed in the printing device 10 from being updated to firmware that does not correspond to the wireless communication device currently coupled to the printing device 10 as the wireless communication device 30. That is, the information processing device 20 can restrain the firmware already installed in the printing device 10 from being updated to firmware that is different from desired firmware.

Figure 7:
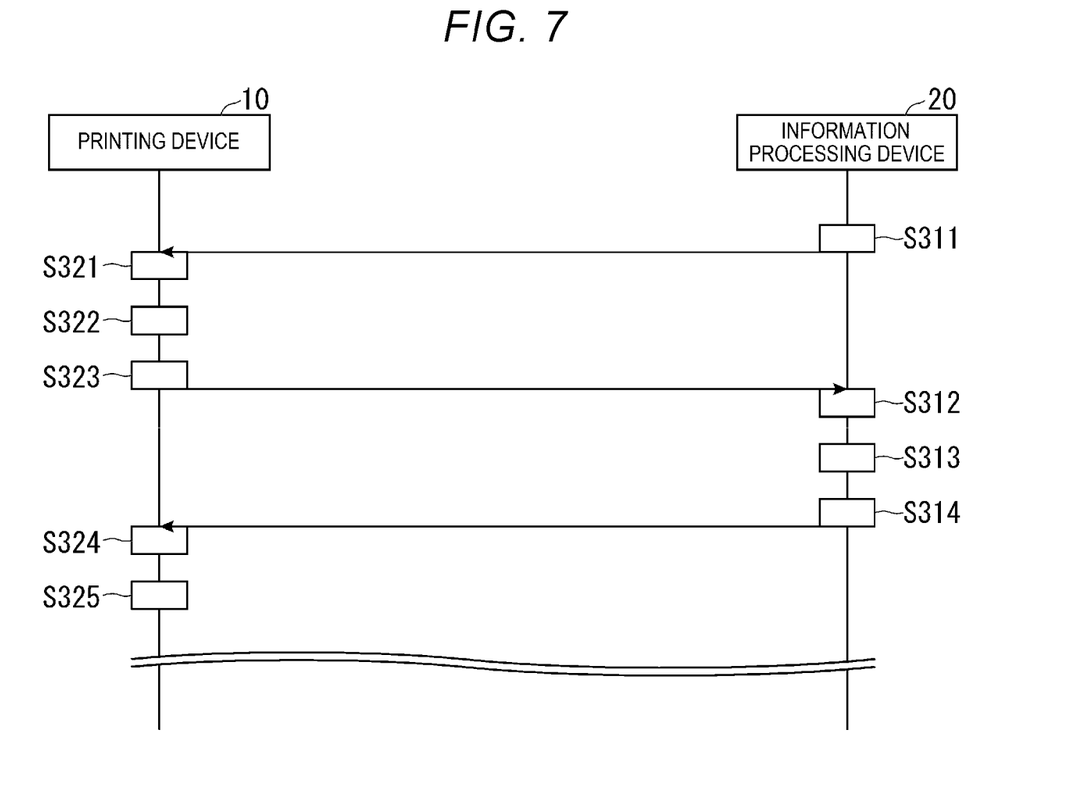
FIG. 7 is a sequence chart showing an example of a flow of processing performed by the printing device and the information processing device in connection with the update of the firmware already installed in the printing device.

Processing Performed by Printing Device and Information Processing Device in Connection with Update of Firmware Already Installed in Printing Device The processing performed by the printing device 10 and the information processing device 20 in connection with the update of the firmware already installed in the printing device 10 will now be described, using an example where the printing device 10 and the information processing device 20 perform their respective processing based on a flow shown in FIG. 7. FIG. 7 is a sequence chart showing an example of the flow of the processing performed by the printing device 10 and the information processing device 20 in connection with the update of the firmware already installed in the printing device 10.

The information processing device 20 transmits, to the printing device 10, a transmission request for identification information identifying the wireless communication device coupled to the printing device 10 as the wireless communication device 30, in response to an accepted update start operation (step S311).

Next, the printing device 10 receives, from the information processing device 20, the transmission request for the identification information transmitted from the information processing device 20 in step S311 (step S321).

Next, on receiving the transmission request for the identification information in step S321, the printing device 10 acquires the identification information identifying the wireless communication device coupled to the printing device 10 as the wireless communication device 30, from this wireless communication device (step S322).

Next, the printing device 10 transmits the identification information acquired in step S322 to the information processing device 20 as a response to the transmission request for the identification information received in step S321 (step S323).

Next, the information processing device 20 receives, from the printing device 10, the identification information transmitted from the printing device 10 in step S323 (step S312).

Next, the information processing device 20 acquires firmware corresponding to the identification information received in step S312, as firmware for update (step S313). As described above, in this example, the wireless communication device coupled to the printing device 10 as the wireless communication device 30 is the second wireless communication device. Therefore, in step S313, the information processing device 20 acquires the firmware corresponding to the identification information identifying the second wireless communication device, that is, the second firmware, as firmware for update.

Next, the information processing device 20 transmits the firmware for update acquired in step S313 to the printing device 10 (step S314).

Next, the printing device 10 receives, from the information processing device 20, the firmware for update transmitted from the information processing device 20 in step S314 (step S324). That is, in this example, the printing device 10 receives the second firmware as the firmware for update from the information processing device 20.

Next, the printing device 10 updates the already installed firmware that is executable when receiving the firmware for update in step S324, to the received firmware for update (step S325). That is, in this example, the printing device 10 updates the first firmware to the second firmware. Thus, the printing device 10 can perform the second wireless communication via the second wireless communication device coupled to the printing device 10 as the wireless communication device 30.

In this way, in the update system 1, the information processing device 20 transmits a transmission request for identification information identifying the wireless communication device 30, to the printing device 10. The printing device 10, when receiving the transmission request from the information processing device 20, transmits the identification information to the information processing device 20. The information processing device 20, when receiving the identification information from the printing device 10, transmits firmware corresponding to the received identification information as firmware for update to the printing device 10. The printing device 10, when receiving the firmware for update from the information processing device 20, updates the already installed firmware that is executable when receiving the firmware for update, to the received firmware for update. Thus, the update system 1 can restrain the firmware already installed in the printing device 10 from being updated to firmware that does not correspond to the wireless communication device currently coupled to the printing device 10 as the wireless communication device 30. That is, the update system 1 can restrain the firmware already installed in the printing device 10 from being updated to firmware that is different from desired firmware.

Figure 8:
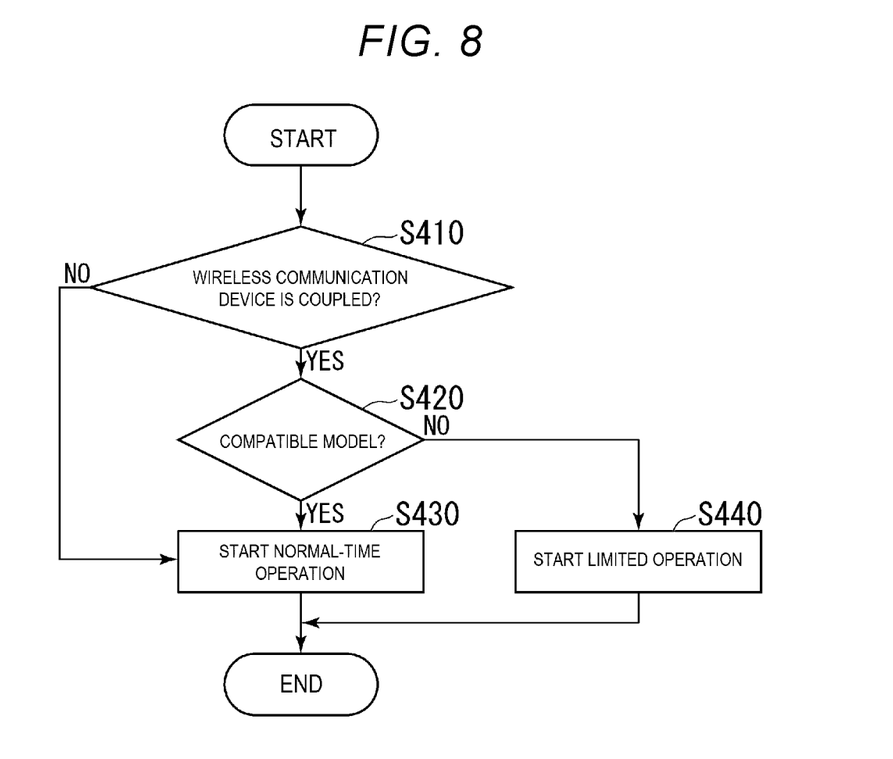
FIG. 8 shows an example of a flow of processing performed by the printing device when the printing device is started up in the state where a wireless communication device of a different type from a compatible model is coupled thereto as the wireless communication device.

Processing Performed by Printing Device when Printing Device is Started Up where Wireless Communication Device of Different Type from Compatible Model is Coupled Thereto The printing device 10 described above performs a different operation from the normal-time operation when the printing device 10 is started up in the state where a wireless communication device of a different type from a compatible model is coupled thereto as the wireless communication device 30. Thus, processing performed by the printing device 10 when the printing device 10 is started up in the state where a wireless communication device of a different type from a compatible model is coupled thereto as the wireless communication device 30 will now be described with reference to FIG. 8. FIG. 8 shows an example of the flow of the processing performed by the printing device 10 when the printing device 10 is started up in the state where a wireless communication device of a different type from a compatible model is coupled thereto as the wireless communication device 30. In the description below, for the sake of convenience, this wireless communication device is referred to as an incompatible wireless communication device. Also, in the description below, an example where the incompatible wireless communication device is coupled to the printing device 10 as the wireless communication device 30 at a timing before the processing in step S410 shown in FIG. 8 is performed is described. Also, in the description below, an example where the printing device 10 is started up after the incompatible wireless communication device is coupled to the printing device 10 as the wireless communication device 30 at that timing, that is, where the power is turned on after the incompatible wireless communication device is coupled to the printing device 10 as the wireless communication device 30, is described.

The control unit 11 determines whether the wireless communication device 30 is coupled to the printing device 10 or not (step S410).

When it is determined that the wireless communication device 30 is not coupled to the printing device 10 (NO in step S410), the control unit 11 causes the printing device 10 to start the normal-time operation (step S430) and ends the processing in the flowchart shown in FIG. 8.

Meanwhile, when it is determined that the wireless communication device 30 is coupled to the printing device 10 (YES in step S410), the control unit 11 determines whether the type of the wireless communication device coupled to the printing device 10 as the wireless communication device 30 is a compatible model or not (step S420). To determine whether the type of the wireless communication device coupled to the printing device 10 as the wireless communication device 30 is a compatible model or not, a known method or a method to be developed from now on may be employed.

When it is determined that the type of the wireless communication device coupled to the printing device 10 as the wireless communication device 30 is a compatible model (YES in step S420), the control unit 11 shifts to step S430 and causes the printing device 10 to start the normal-time operation.

Meanwhile, when it is determined that the type of the wireless communication device coupled to the printing device 10 as the wireless communication device 30 is not a compatible model (NO in step S420), the control unit 11 causes the printing device 10 to perform a predetermined limited operation (step S440) and ends the processing in the flowchart shown in FIG. 8. The predetermined limited operation is an operation that can execute only a part of the normal-time operation. The limited operation excludes at least printing and communication. That is, in this case, the control unit 11 does not perform at least printing and communication. The control unit 11 may be configured to turn on an error LED (light-emitting diode) and stop the operation in this case.

In this way, the printing device 10 may be configured not to perform at least printing and communication when a wireless communication device of a different type from a predetermined type, that is, an incompatible wireless communication device, is coupled to the printing device 10 as the wireless communication device 30. Thus, the printing device 10 can be restrained from operating while still in the state where the incompatible wireless communication device is coupled thereto as the wireless communication device 30. Therefore, the printing device 10 can restrain the user from repeatedly updating the firmware in the printing device 10 without recognizing that the incompatible wireless communication device is coupled to the printing device 10.

The printing device 10 described above may be configured to transmit, to the information processing device 20, information representing the latest use history of the use history of the wireless communication device used by the printing device 10 as the wireless communication device 30 in the past, as identification information. The use history of the wireless communication device used by the printing device 10 as the wireless communication device 30 in the past is, for example, the history of the wireless communication device coupled to the printing device 10 as the wireless communication device 30 in the past. The use history of the wireless communication device used by the printing device 10 as the wireless communication device 30 in the past may be another history corresponding to the history of the wireless communication device coupled to the printing device 10 as the wireless communication device 30 in the past. In FIG. 8, the case where the power is turn on after an incompatible wireless communication device is coupled to the printing device 10 as the wireless communication device 30 is described. However, for example, a case where an incompatible wireless communication device is coupled to the printing device 10 as the wireless communication device 30 after the power of the printing device 10 is turned on may be employed.

As described above, the update system according to the embodiment is an update system having a printing device configured to be coupled to a wireless communication device performing first communication, and a processing device configured to be coupled to the printing device via second communication that is different from the first communication by the wireless communication device. The processing device transmits a transmission request for identification information identifying the wireless communication device, to the printing device. The printing device, when receiving the transmission request from the processing device, transmits the identification information to the processing device. The processing device, when receiving the identification information from the printing device, transmits firmware corresponding to the received identification information as firmware for update to the printing device. The printing device, when receiving the firmware for update from the processing device, updates already installed firmware that is executable when receiving the firmware for update, to the received firmware for update. Thus, the update system can restrain the firmware already installed in the printing device from being updated to firmware that is different from desired firmware. In the above example, the update system 1 is an example of the update system. In the above example, each of the first wireless communication, the second wireless communication, and the third wireless communication is an example of the first communication. In the above example, the communication between the printing device 10 and the information processing device 20 via the communication unit 14 is an example of the second communication. In the above example, the information processing device 20 is an example of the processing device. In the above example, the wireless communication device 30 is an example of the wireless communication device.

The update system may employ a configuration where the identification information is information representing a type of the wireless communication device currently coupled to the printing device or information representing use history of the wireless communication device used by the printing device.

The printing device according to the embodiment includes: a coupling unit configured to be coupled to a wireless communication device performing first communication; a communication unit performing second communication that is different from the first communication, with a processing device; and a control unit. The control unit, when receiving a transmission request for identification information identifying the wireless communication device, transmits the identification information to the processing device. The control unit, when receiving firmware corresponding to the identification information transmitted to the processing device as firmware for update from the processing device, updates already installed firmware that is executable when receiving the firmware for update, to the firmware for update. Thus, the printing device can restrain the firmware already installed in the printing device from being updated to firmware that is different from desired firmware.

In the printing device, the control unit may be configured not to perform at least printing when the wireless communication device of a different type from a predetermined type is coupled thereto. In the above example, the incompatible wireless communication device is an example of the wireless communication device of a different type from a predetermined type.

An embodiment of the present disclosure has been described in detail with reference to the drawings. However, the present disclosure is not limited to the specific configurations in the embodiment. Various changes, replacements, deletions and the like can be made without departing from the spirit and scope of the present disclosure.

A program for implementing the function of any component of the device described above may be recorded in a computer-readable recording medium, and a computer system may read and execute the program. The device is, for example, the printing device 10, the information processing device 20, the wireless communication device 30 or the like. The "computer system" in this case includes an OS (operating system) and hardware such as a peripheral device. The "computer-readable recording medium" is a portable medium such as a flexible disk, magneto-optical disk, ROM, or CD (compact disk)-ROM, or a storage device such as a hard disk built in the computer system. The "computer-readable recording medium" also includes a recording medium holding the program for a predetermined time, such as a volatile memory inside a computer system functioning as a server or client when the program is transmitted via a network such as the Internet or via a communication line such as telephone line.

The program may be transmitted from the computer system storing the program in a storage device or the like to another computer system via a transmission medium or via a transmission wave in the transmission medium. The "transmission medium" transmitting the program is a medium having the function of transmitting information, like a network such as the internet or a communication line such as a telephone line.

The program may be for implementing a part of the foregoing functions. The program may also be configured to implement the foregoing functions when combined with a program already recorded in the computer system, that is, a so-called difference file or difference program.

What is claimed is:

1. An update system comprising:
    a printing device configured to be physically and externally coupled to a wireless communication device to communicate with the wireless communication device via a wired communication, with the wireless communication device performing first communication which is a wireless communication; and
    a processing device configured to communicate with the printing device via second communication that is different from the first communication by the wireless communication device, wherein
    the processing device transmits a transmission request for identification information identifying the wireless communication device, to the printing device,
    the printing device, when receiving the transmission request from the processing device, transmits the identification information to the processing device,
    the processing device, when receiving the identification information from the printing device, acquires firmware including a driver for controlling the wireless communication device based on the received identification information, and sends the acquired firmware as firmware for update to the printing device, and
    the printing device, when receiving the firmware for update from the processing device, updates firmware stored in a computer memory to the firmware for update.

2. The update system according to claim 1, wherein
    the identification information is information representing a type of the wireless communication device currently coupled to the printing device or information representing use history of the wireless communication device used by the printing device.

3. A printing device comprising:
    a connector configured to be physically and externally coupled to a wireless communication device to communicate with the wireless communication device via a wired communication, with the wireless communication device performing first communication which is a wireless communication;
    a communication hardware performing second communication that is different from the first communication to communicate with a processing device;
    a computer memory storing firmware; and
    a processor, wherein
    the processor,
        when receiving a transmission request for identification information identifying the wireless communication device, transmits the identification information to the processing device, and
        when receiving firmware including a driver for controlling the wireless communication device based on the identification information as firmware for update from the processing device, updates firmware stored in the computer memory to the firmware for update.

4. The printing device according to claim 3, wherein
    the processor does not perform at least printing or communication when the wireless communication device of a different type from a predetermined type is coupled thereto.

5. A non-transitory computer-readable storage medium storing a program, the program causing a processing device to update firmware in a printing device, with the printing device being configured to be physically and externally coupled to a wireless communication device to communicate with the wireless communication device via a wired communication, with the wireless communication device performing first communication which is a wireless communication, the program causing the processing device to execute:

transmitting a transmission request for identification information identifying the wireless communication device, to the printing device; and     when receiving the identification information from the printing device, acquiring firmware including a driver for controlling the wireless communication device based on the received identification information, and sending the acquired firmware as firmware for update to the printing device.

\* \* \* \* \*